(12) United States Patent
Choi (10) Patent No.: US 7,769,758 B2
(45) Date of Patent: Aug. 3, 2010

(54) SYSTEM AND METHOD FOR MANAGING BUNDLE DATA DATABASE STORING DATA ASSOCIATION STRUCTURE

(76) Inventor: Jin-Keun Choi, 38-1006 Gaenari Apt., 711-1 Yeoksam-dong, Gangnam-gu, Seoul135-080 (KR)

( * ) Notice: Subject to any disclaimer, the term of this patent is extended or adjusted under 35 U.S.C. 154(b) by 302 days.

(21) Appl. No.: 12/088,326

(22) PCT Filed: Sep. 28, 2006

(86) PCT No.: PCT/KR2006/003882
§ 371 (c)(1),
(2), (4) Date: Mar. 27, 2008

(87) PCT Pub. No.: WO2007/037629
PCT Pub. Date: Apr. 5, 2007

(65) Prior Publication Data
US 2008/0208848 A1    Aug. 28, 2008

(30) Foreign Application Priority Data
Sep. 28, 2005  (KR) .................. 10-2005-0090762
Nov. 3, 2005   (KR) .................. 10-2005-0104668

(51) Int. Cl.
G06F 17/30 (2006.01)
G06F 17/21 (2006.01)
G06F 17/26 (2006.01)
(52) U.S. Cl. .................. 707/736; 704/10; 715/234
(58) Field of Classification Search .................. None
See application file for complete search history.

(56) References Cited

U.S. PATENT DOCUMENTS 5,983,237 A * 11/1999 Jain et al. .................. 1/1

(Continued)

FOREIGN PATENT DOCUMENTS

EP    1 489 525 A1    12/2004

(Continued)

OTHER PUBLICATIONS

International Search Report dated Jan. 15, 2007.

(Continued)

*Primary Examiner*—Neveen Abel Jalil
*Assistant Examiner*—Tarek Chbouki
(74) *Attorney, Agent, or Firm*—Brinks Hofer Gilson & Lione (57) ABSTRACT

A bundle database management system comprises a search server including a bundle definition unit for defining a core word and a relevant word connected to the core word, and connection relation between the core and relevant words to generate and store bundle data; a description definition unit for defining description data corresponding to the core and relevant words; a search request receiving unit for receiving a search request including a specific search word input by a user; a search result page generating unit for generating a search result page including the bundle data retrieved by the search word as a core word and the description data retrieved by the core word; and a search result page transmitting unit for transmitting the search result page to the user; and a user terminal connected to the search server for transmitting the search request and receiving the search result page.

11 Claims, 8 Drawing Sheets

U.S. PATENT DOCUMENTS

| | | | |
|---|---|---|---|
| 6,442,545 B1* | 8/2002 | Feldman et al. | 1/1 |
| 6,502,091 B1* | 12/2002 | Chundi et al. | 1/1 |
| 6,792,414 B2* | 9/2004 | Chaudhuri et al. | 1/1 |
| 7,028,024 B1 | 4/2006 | Kommers et al. | |
| 2001/0047355 A1 | 11/2001 | Anwar | |
| 2003/0217052 A1* | 11/2003 | Rubenczyk et al. | 707/3 |
| 2004/0015481 A1* | 1/2004 | Zinda | 707/1 |
| 2004/0122656 A1 | 6/2004 | Abir | 704/4 |
| 2005/0080776 A1* | 4/2005 | Colledge et al. | 707/3 |
| 2005/0154690 A1* | 7/2005 | Nitta et al. | 706/46 |
| 2005/0171760 A1* | 8/2005 | Tinkler | 704/10 |
| 2005/0210009 A1* | 9/2005 | Tran | 707/3 |
| 2005/0278623 A1* | 12/2005 | Dehlinger et al. | 715/517 |
| 2006/0036633 A1* | 2/2006 | Chong et al. | 707/101 |
| 2006/0047636 A1* | 3/2006 | Mohania et al. | 707/3 |
| 2006/0167931 A1* | 7/2006 | Bobick et al. | 707/102 |
| 2007/0088683 A1* | 4/2007 | Feroglia et al. | 707/4 |
| 2007/0118515 A1* | 5/2007 | Dehlinger | 707/3 |
| 2007/0156677 A1* | 7/2007 | Szabo | 707/5 |
| 2007/0208719 A1* | 9/2007 | Tran | 707/3 |
| 2007/0214126 A1* | 9/2007 | Kikinis | 707/3 |
| 2008/0016020 A1* | 1/2008 | Estes | 706/52 |
| 2008/0077570 A1* | 3/2008 | Tang et al. | 707/5 |
| 2008/0162514 A1* | 7/2008 | Franks et al. | 707/100 |
| 2008/0281814 A1* | 11/2008 | Calistri-Yeh et al. | 707/5 |

FOREIGN PATENT DOCUMENTS

| | | |
|---|---|---|
| KR | 10 2001 0056963 A | 7/2001 |
| KR | 10 2004 0063641 A | 7/2004 |
| KR | 2004-63641 | 7/2004 |
| KR | 20030001134 | 6/2006 |
| WO | WO 2007/037629 A1 | 4/2007 |

OTHER PUBLICATIONS

Written Opinion dated Jan. 15, 2007.

* cited by examiner

1) HORIZONTAL LINE-A TYPE CONNECTION

[Fig. 7]

2) HORIZONTAL LINE END-B TYPE CONNECTION

[Fig. 8]

3) HORIZONTAL LINE-B TYPE INSERTION CONNECTION

[Fig. 9]

4) VERTICAL LINE-B TYPE CONNECTION

[Fig. 10]

5) VERTICAL LINE END-A TYPE CONNECTION

[Fig. 11]

6) VERTICAL LINE-A TYPE INSERTION CONNECTION

SYSTEM AND METHOD FOR MANAGING BUNDLE DATA DATABASE STORING DATA ASSOCIATION STRUCTURE

TECHNICAL FIELD

The present invention relates to bundle database management system and method, in particularly, to bundle database management system and method which provides a search service by generating bundle data defining an association structure of relevant words related to a specific word, storing it in a bundle database, and including bundle data retrieved from the bundle database by a search word input by a user in a search result.

BACKGROUND ART

A conventional search system retrieves a search database (DB) by a search word received from a user and provides the retrieved data arranged in order. For example, when a user transmits a search request for a search word of X, a search server retrieves data according to category classification (e.g., site, knowledge, news, dictionary and so on) and arranges the corresponding data according to the order of each category group to provide a search result page.

The conventional search system is mainly designed for a depth-mining search for a specific search word, and it just provides a simple arrangement of information related to the search word and thus it requires a user to grasp the association of the retrieved information on his/her own. For example, when the user inputs "hippie" as a search word, the conventional search system provides information directly related to the word, "hippie" as search results. The user can obtain a professional knowledge directly related to "hippie" from the conventional search system, not a peripheral knowledge related to "hippie". Thus, the conventional search system is impossible to expand to three-dimensional and applicable related knowledge based on organic association of words forming search results, and consequently it is improper to create new knowledge through assembly and association of information.

For example, when the user inputs "hippie" as a search word, a search result page generated by the conventional search system just shows the titles of websites including "hippie" or connection routes of contents including "hippie". Thereby, the conventional search system has a limitation in providing the user with an opportunity of access to only information having a direct association with "hippie".

The word, "hippie" has association with words, "psychedelic", "Beatles", and "mods look", however, the conventional search method has difficulty in getting access to all information related to "hippie".

An alternative method may get access to contents having a direct association with "hippie", grasp the subject matter of the corresponding contents, and find out association between "hippie" and "psychedelic" (this step is not an easy job). Subsequently, the method inputs a search word of "psychedelic" and gets access to contents having a direct association with "psychedelic" from the search results, thereby expanding the width of knowledge for an object of search.

However, such a method repetitively performs the steps for checking the subject matter of an individual search result and inferring a search word, thereby resulting in increased time and efforts of a user required for search.

DISCLOSURE OF INVENTION

Technical Problem

The present invention is designed to solve the problems of the prior art, and therefore it is an object of the present invention to generate bundle data defining association relation between individual data to construct a bundle database and provide a search service through the bundle database. Thus, the present invention reduces efforts and time required for search and systematically provides similarly related information for a specific search word to search for relevant words that the user has not thought in advance, thereby expanding the width of knowledge for search.

Technical Solution

In order to achieve the above-mention objects, in a bundle database system for generating, storing and searching bundle data defining an association structure between individual words having relation to each other, a bundle database management system for storing a data association structure according to the present invention comprises a search server including a bundle definition unit for defining a core word and a relevant word connected to the core word, and connection relation between the core word and the relevant word to generate and store bundle data; a description definition unit for defining description data corresponding to the core word and the relevant word; a search request receiving unit for receiving a search request including a specific search word input by a user; a search result page generating unit for generating a search result page including the bundle data retrieved by the core word as a search word and the description data retrieved by the core word; and a search result page transmitting unit for transmitting the search result page to the user; and a user terminal connected to the search server for transmitting the search request and receiving the search result page.

Further, in a bundle database management method for generating, storing and searching bundle data defining an association structure between individual words having relation to each other, the bundle database management method for storing a data association structure according to the present invention comprises the steps of (1) generating and storing bundle data including a core word, a relevant word connected to the core word, and connection relation defined between the core word and the relevant word; (2) storing description data corresponding to the core word and the relevant word; (3) receiving a search request including a specific search word input by a user; (4) generating a search result page including the bundle data retrieved by the search word as a core word and the description data retrieved by the core word; and (5) transmitting the search result page to a user terminal.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE FOR CARRYING OUT THE INVENTION

Figure 1:
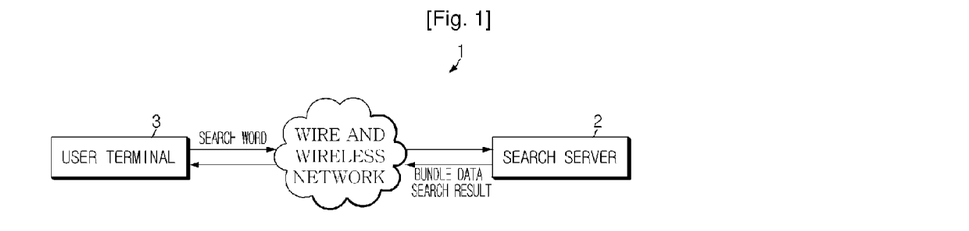
FIG. 1 is a schematic view of the structure of a bundle database management system in accordance with an exemplary embodiment of the present invention.

Hereinafter, preferred embodiments of the present invention will be described in detail with reference to the accompanying drawings. FIG. 1 is a schematic view of the structure of a bundle database management system 1 in accordance with an exemplary embodiment of the present invention.

The bundle database management system 1 according to an exemplary embodiment of the present invention has a search server 2 and a user terminal 3.

The search server 2 generates bundle data for defining association (relation) between search words (words) of an object for search and storing connection relation between the search words, and stores the bundle data in a bundle database. Also, the search server 2 receives a search request for a specific search word from the user terminal 3, and transmits bundle data for graphically representing a connection structure of relevant data related to the search word with search result data (hereinafter referred to as description data) corresponding to the search word, thereby providing a search service.

The user terminal 3 is connected to the search server 2 through wire and wireless network and transmits a search request for a specific search word input by the user. The user terminal 3 receives a search result page in response to the search request. The search result page includes description data of the search word and bundle data defining connection structure of relevant words related to the search word. The definition and structure of bundle data suggested by the present invention are described in detail as follows.

Figure 2:
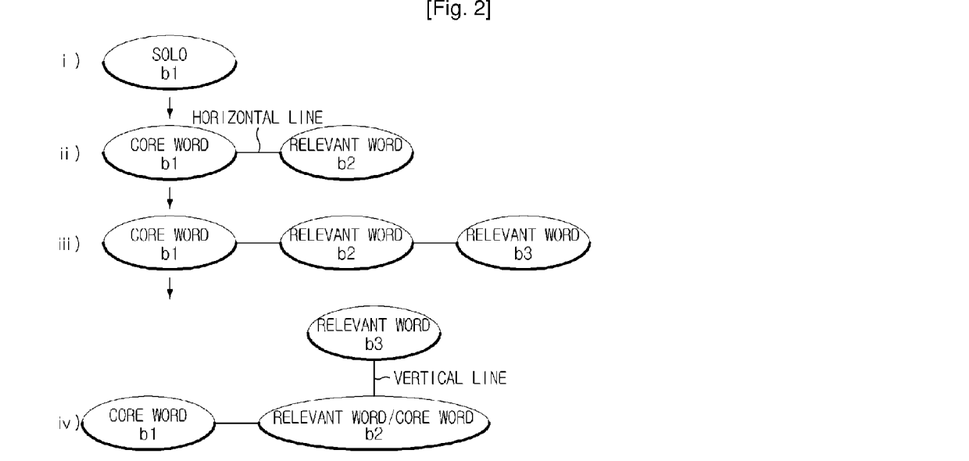
FIG. 2 is a view of a connection structure of bundle data in accordance with an exemplary embodiment of the present invention.

FIG. 2 is a view of a connection structure of bundle data in accordance with an exemplary embodiment of the present invention.

Here, the word includes a word (for example: "hippy") containing physical syllables as well as a word (for example: "hippie") typically recognized as a word having meaning. That is to say, the word is not necessarily a single word and may be a narrative sentence (for example: "hippie-cultural") containing at least two words combined with each other.

i) solo: a word may be defined as a cell, and if there is a single cell (word) of b1, the cell is defined as a solo.

ii) bundle data: bundle data includes a) a single core word, b) at least one relevant word connected to the core word, and c) connection relation between the core word and the relevant word. If a relevant cell (word) is connected to solo, the solo becomes a core word b1 and the connected cell becomes a relevant word b2.

iii) addition of data b3: if a new relevant word b3 is added to a core word b1, connection is formed in the structure of b1-b2-b3. The relevant words b2 and b3 may or not be related to each other, but necessarily they have association with the core word b1.

iv) association of data b2 and b3: if data b2 becomes as a core word of data b3 in the above iii), data b3 is connected to data b2 by a vertical line. In this case, the core word b1 has association with data b3 through data b2 as a relevant word and core word.

In the present invention, connection relation of bundle data is represented in two types, that is a horizontal connection by a horizontal line and a vertical connection by a vertical line. The horizontal connection is a rightward connection of a relevant word to a core word of the leftmost side, and the vertical connection is an upward connection of a relevant word to a core word of the lowest side. The vertical connection is derived from the relevant word forming the horizontal connection, and a starting word of the vertical connection becomes a relevant word of horizontal connection structure and core word of vertical connection structure. In the horizontal connection structure, a relevant word at the left side has stronger association with a core word than a relevant word at the right side, and in the vertical connection structure, a relevant word at the lower side has stronger association than a relevant word at the upper side.

In the present invention, terms of solo, core word and relevant word have relative concepts changing according to core word criteria (for example: in (iv) of FIG. 2, b2 is a relevant word of a core word b1 and core word of b3 connected to b2 by a vertical line).

Figure 3:
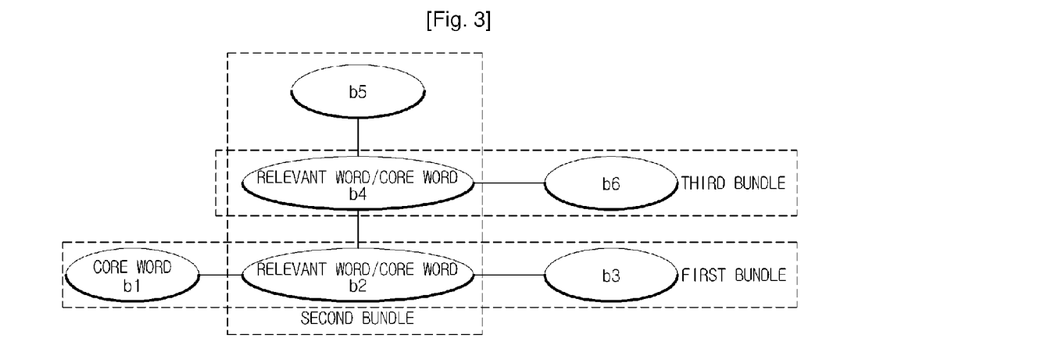
FIG. 3 is an example view of n-dimensional connection relation of bundle data in accordance with an exemplary embodiment of the present invention.

FIG. 3 is an example view of n-dimensional connection relation of bundle data in accordance with an exemplary embodiment of the present invention.

FIG. 3 shows a three-dimensional (n=3) bundle consisting of six cells (words) in practice. The below table 1 defines the concept of the terminology, 'bundle' of the present invention through a three-dimensional bundle shown in FIG. 3.

TABLE 1

| Terms | Definition |
| --- | --- |
| a first bundle | a bundle including a single core word and at least one relevant word primarily connected to the core word by association with the core word ex) first bundle of b1: b1(core word), b2, b3 first bundle of b2: b2(core word), b4, b5 first bundle of b4: b4(core word), b6 |
| a second bundle | a bundle including an arbitrary relevant word constituting the first bundle used as a core word and a subordinate relevant word connected to the core word |

TABLE 1-continued

| Terms | Definition |
| --- | --- |
| | ex) second bundle of b1: b2(core word), b4, b5 second bundle of b2: b4(core word), b6 |
| a third bundle | a bundle including an arbitrary relevant word constituting the second bundle used as a core word and a subordinate relevant word connected to the core word ex) third bundle of b1: b4, b6 |
| nth bundle | a bundle having nth connection relation expanded according to the first, second and third bundle structures |
| n-dimensional bundle | a bundle having the whole nth relation including a core word of an atomic bundle and the whole relevant word ex) based on b1: b1, b2, b3, b4, b5, b6 are third bundle, based on b2: b2, b4, b5, b6 are second bundle based on b4: b4, b6 are first bundle |
| an atomic bundle | a bundle including the whole relevant words initially formed by a search word b1 of a user as a core word |
| a molecular bundle | a bundle including a relevant word forming an atomic bundle used as a core word and a subordinate relevant word connected to the core word ex) molecular bundle 1: b2, b4, b5, b6 molecular bundle 2: b4, b6 |

Describing the structure of a bundle shown in FIG. 3 with reference to the above table 1, a core word b1 forms a three-dimensional bundle as a whole. Because the bundle is expanded to a third bundle b4, b6 based on the core word b1. The three-dimensional bundle structure is divided into a first bundle including b1, b2, and b3 based on b1, a second bundle including b2, b4, and b5, and a third bundle including b4 and b6, and odd bundle (n=1, 3, 5 . . . ) is a bundle in which words are connected by a horizontal line and even bundle (n=2, 4, 6 . . . ) is a bundle in which words are connected by a vertical line.

Here, for the sake of convenience of description, a bundle in which a first bundle is connected by a horizontal line is referred to as a horizontal bundle, and when a bundle is mentioned in the description, the bundle will be understood as a horizontal bundle.

Meanwhile, the core word b1 has a direct association with the relevant words b2 and b3 primarily connected to b1, and has association with b4, b5 and b6 by expansion through b2 and b4 as relevant words and core words. That is to say, b1 has association with b4 and b5 through b2 as a relevant word and core word, and has association with b6 through b4 as a relevant word and core word. In this manner, a bundle continues to form and develop by organic expansion of association through a word (cell) as a relevant word and core word.

Figure 4:
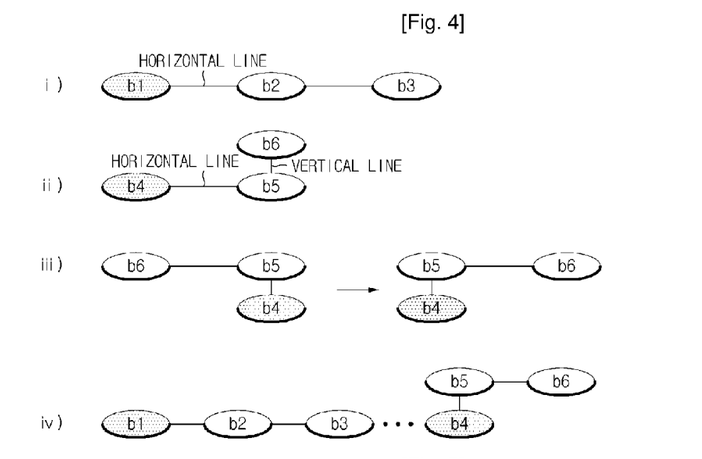
FIG. 4 is an example view of bundle connection of a search server in accordance with an exemplary embodiment of the present invention.

FIG. 4 is an example view of bundle connection executed by a search server 2 in accordance with an exemplary embodiment of the present invention.

Describing the expansion of bundle by connection of arbitrary bundles, let us assume that a second-dimensional bundle of b4 (a core word)-b5 (a relevant word)-b6 (a relevant word) is additionally connected to b3 in a first-dimensional bundle i (FIG. 4) of b1 (a core word)-b2 (a relevant word)-b3 (a relevant word). For connection of the two bundles, a connection structure of b4-b5-b6 is rotated 90 degrees in a counterclockwise direction (the left side in iii of FIG. 4) and subsequently is axisymmetrically rotated (the right side in iii of FIG. 4). Next, the axisymmetrically rotated bundle (b4-b5-b6) is connected to a horizontal line derived from b3 (iv of FIG. 4).

As described above, when connecting bundles, the bundle (b4-b5-b6) to be connected is rotated 90 degrees in a counterclockwise direction and subsequently is axisymmetrically rotated on purpose to maintain an independent bundle structure of the bundle (b4-b5-b6), otherwise, if the bundle (b4-b5-b6) is connected without rotation, b4 loses a function of a core word as shown in ii of FIG. 4 and just serves as a relevant word of b1 (a core word), consequently the bundle (b4-b5-b6) does not maintain an independent structure and is absorbed into the bundle (b1-b2-b3), thereby losing the independent structure thereof.

The detailed description of the principle of bundle connection suggested by the present invention is made with reference to FIGS. 6 to 11 as follows.

As shown in FIG. 4, bundle data can be expanded and developed to n-dimensional bundle through bundle connection. On the assumption that the search server 2 constructs the b1-b2-b3 bundle and the b4-b5-b6 bundle as database, the search server 2 receives the search word b1 input from the user, extracts the b1-b2-b3 bundle by b1 as a core word, extracts the b4-b5-b6 bundle having an arbitrary relevant word included in the extracted bundle as a core word, connects the b1-b2-b3 bundle and the b4-b5-b6 bundle as described above and provides it the user. Thereby the user can be provided with information of various fields through the bundle data from information of all the relevant words having association with b1.

Figure 5:
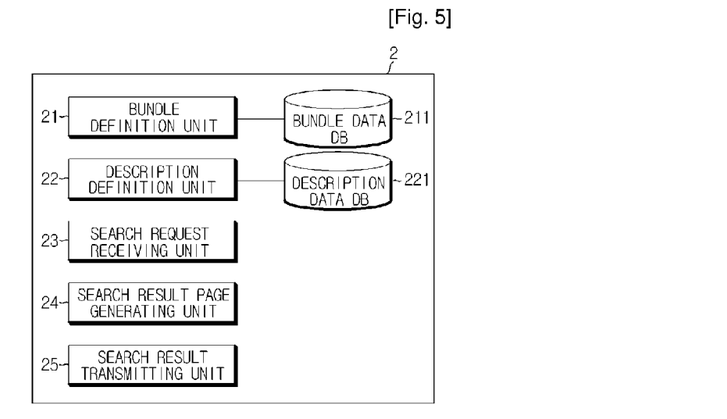
FIG. 5 is a view of an internal structure of the search server in accordance with an exemplary embodiment of the present invention.

FIG. 5 is a view of an internal structure of a search server 2 in accordance with an exemplary embodiment of the present invention.

The search server 2 according to an exemplary embodiment of the present invention includes a bundle definition unit 21, a description definition unit 22, a search request receiving unit 23, a search result page generating unit 24, and a search result transmitting unit 25. Also, a database management system (DBMS) of a bundle database includes a bundle data DB 211 and a description data DB 221.

The bundle definition unit 21 defines a core word, a relevant word connected to the core word, defines connection relation between the core word and the relevant word to generate bundle data and store the bundle data in the bundle data DB 211. A manufacturer constructs and generates the initial bundle data DB 211, and thereafter the user is provided with a given bundle definition interface display and generates or deletes words and connection relation thereof thereby to freely define bundle structure.

For example, the user can define various information as bundle structure and store it in his/her web blog (blog) or mini homepage exclusively assigned to members. For incorporating this, it is preferred to define connection relation between a core word and a relevant word in the blog or mini-homepage and provide the blog or mini-homepage with a bundle manufacture tool for inputting description data related to each word.

The description definition unit 22 links an individual word (a core word or a relevant word) forming bundle data to description data and stores it in the description data DB 221.

The search request receiving unit 22 receives a search request including a specific search word input by the user from the user terminal 3.

The search result page generating unit 24 retrieves bundle data DB 211 by the search word as a core word and retrieves all of word data forming an atomic bundle or a molecular bundle thereby to generate graphic bundle data based on the above-mentioned connection relation (the horizontal connection, the vertical connection). The search result page generating unit 24 also retrieves the description data DB 221 by search word (a core word of an atomic bundle or a molecular bundle) to search for the corresponding description data. And the search result page generating unit 24 generates a search result page including the above-mentioned graphic bundle data and description data.

Here, individual words of bundle data included in the search result page have a hyperlink (URL information) which allows for reference to description data. Thereby the user terminal 3 receives the search result page, displays it on a screen. When the user selects a specific word (cell) of bundle data, the search server 2 receives the corresponding URL information, refers to the corresponding description data and provide it through the search result page.

The search result transmitting unit 25 transmits the generated search result page to the user terminal 3 in response to the search request and selection of bundle data by the user.

FIGS. 6 to 11 are example views of bundle data by six connection methods in accordance with an exemplary embodiment of the present invention. A bundle that is rotated 90 degrees in a counterclockwise direction and subsequently is axisymmetrically rotated is hereinafter referred to 'a rotated bundle' for the sake of convenience of description.

Figure 6:
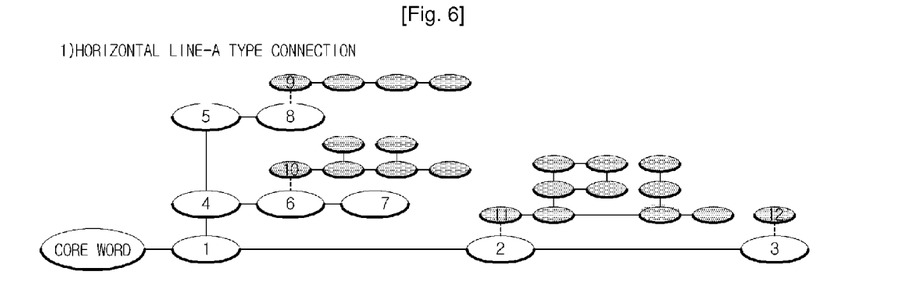
FIGS. 6 to 11 are example views of bundle data according to six connection methods in accordance with an exemplary embodiment of the present invention.

FIG. 6 shows a vertical line-A type connection method. When bundles (including solo) (9~, 10~, 11~) are connected to arbitrary relevant words 2, 3, 6, 8 located on horizontal lines of atomic bundles, the vertical line-A type connection method converts the relevant words 2, 3, 6, 8 to core words and connects the bundles (9~, 10~, 11~, 12) to the vertical lines derived from the core words, respectively, as they are.

Figure 7:
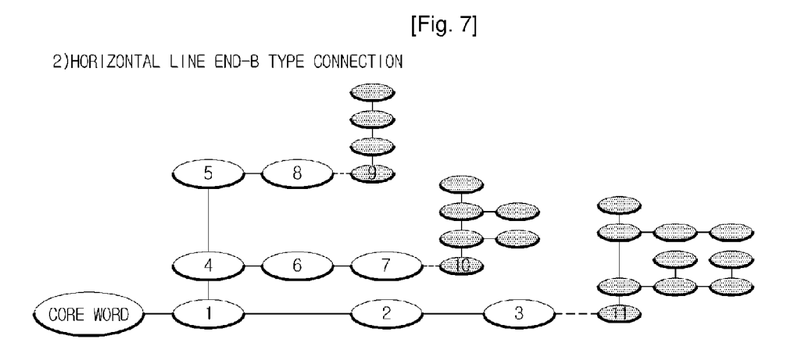

FIG. 7 shows a horizontal line end-B type connection method. When bundles (including solo) (9~, 10~, 11~) are connected to arbitrary relevant words 3, 7, 8 located at horizontal line ends of atomic bundles, respectively, the horizontal line end-B type connection method converts the bundles (9~, 10~, 11~) to be added into rotated bundles and connects bundles (9~, 10~, 11~) to the horizontal lines derived from the relevant words, respectively.

Figure 8:
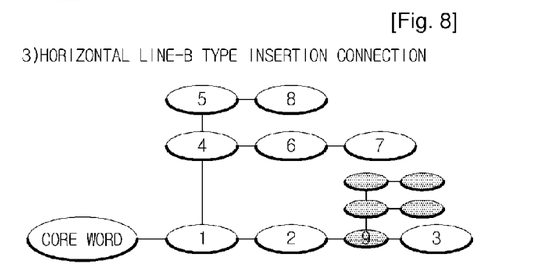

FIG. 8 shows a horizontal line-B type insertion connection method. The horizontal line-B type connection method inserts a bundle (including solo) (9~) between a relevant word 2 and a relevant word 3 located on the horizontal line of an atomic bundle. At this time, the bundle (9~) to be inserted is converted into a rotated bundle and inserted in the horizontal line between the relevant word 2 and the relevant word 3.

Figure 9:
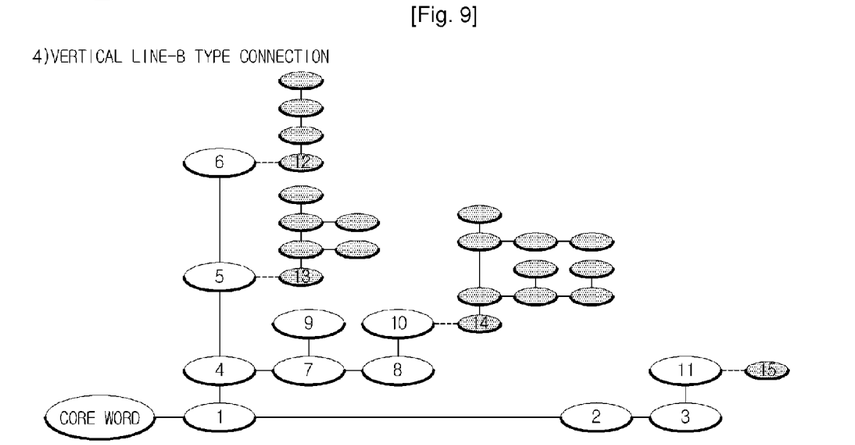

FIG. 9 shows a vertical line-B type connection method. When bundles (including solo) (12~, 13~, 14~, 15) are connected to arbitrary relevant words 5, 6, 10, 11 located on the vertical lines of atomic bundle, respectively, the vertical line-B type connection method converts the relevant words 5, 6, 10, 11 into core words, converts the bundles (12~, 13~, 14~, 15) to be added into rotated bundles and connects them to the horizontal lines derived from the relevant words 5, 6, 10, 11, respectively.

Figure 10:
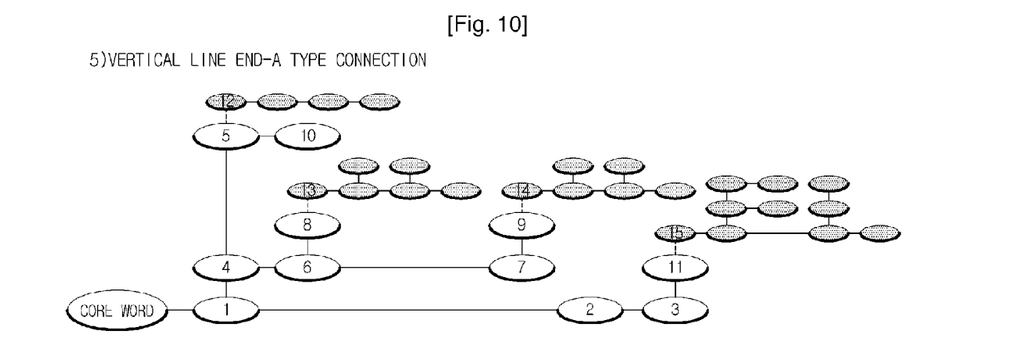

FIG. 10 shows a vertical line end-A type connection method. When bundles (including solo) (12~, 13~, 14~, 15~) are connected to arbitrary relevant words 5, 8, 9, 11 located at the vertical ends of atomic bundles, respectively, the horizontal line end-B type connection method connects bundles (12~, 13~, 14~, 15~) to be added to the vertical lines derived from the relevant words 5, 8, 9, 11, respectively, as they are.

Figure 11:
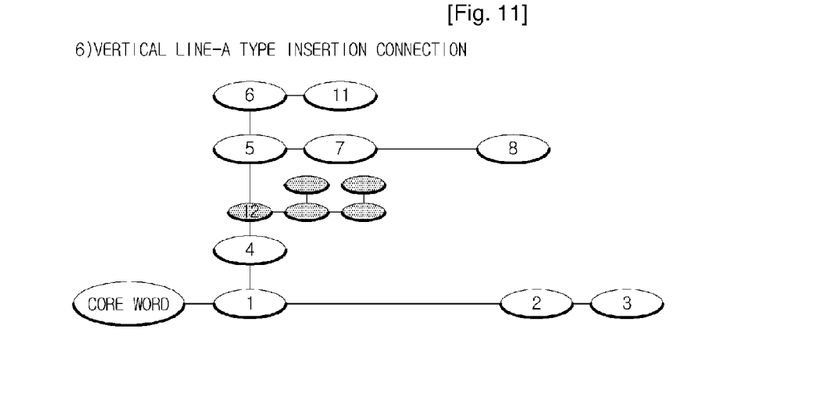

FIG. 11 shows a vertical line-A type insertion connection method. The vertical line-A type insertion connection method inserts a bundle (including solo) (12~) between a relevant word 4 and a relevant word 5 located on the vertical line of an atomic bundle. At this time, the bundle (12~) to be inserted is inserted in the vertical line between the relevant word 4 and the related word 5, as it is.

Figure 12:
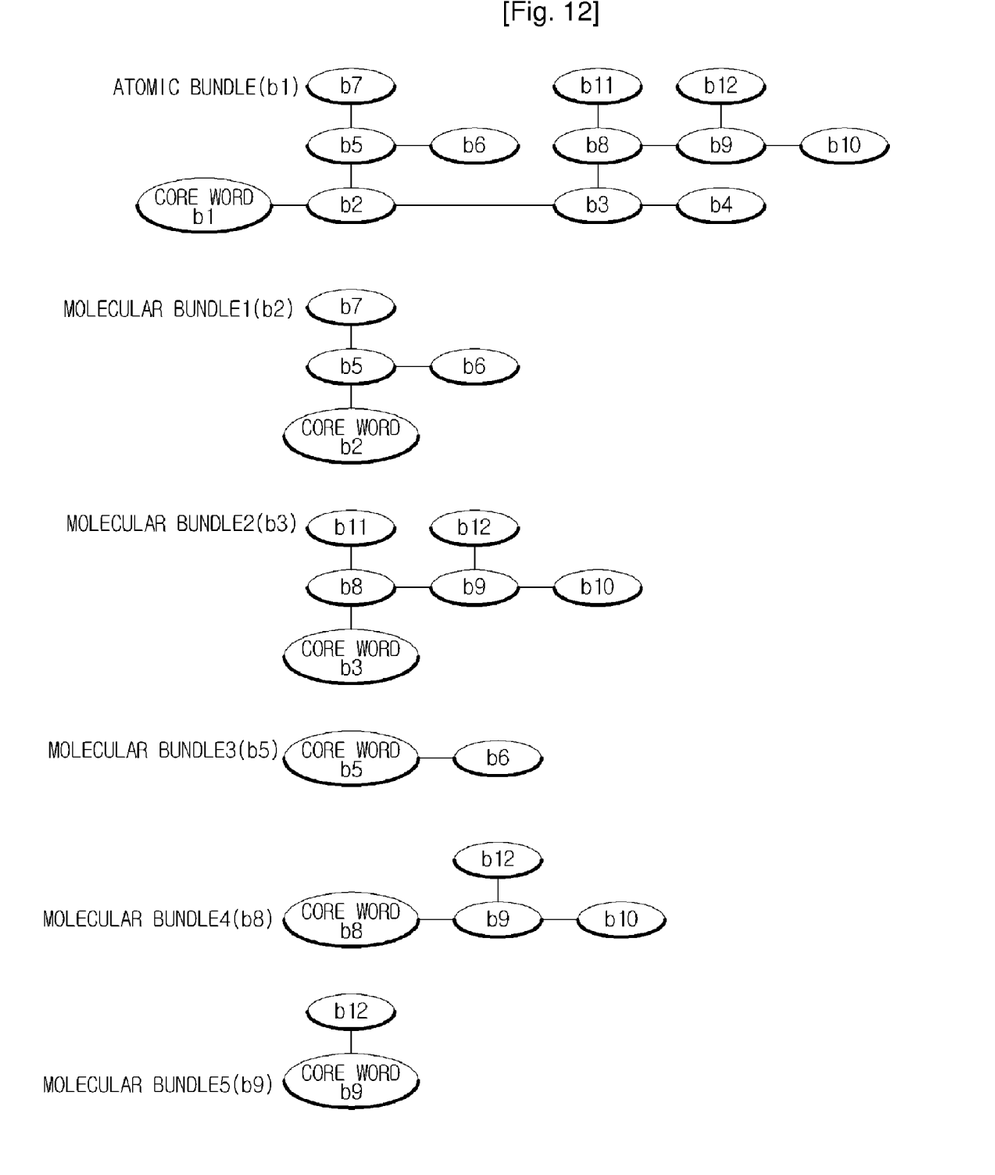
FIG. 12 is an example view of storage of bundle data in accordance with an exemplary embodiment of the present invention.

FIG. 12 shows bundle data according to an exemplary embodiment of the present invention.

The storage structure of bundle data DB 211 is described below with reference to an atomic bundle (four-dimensional bundle of b1) as shown in FIG. 12.

An atomic bundle consists of totally twelve words (cells) of b1 to b12 and includes b1 as a core word of an atomic bundle and b2, b3, b5, b8, b9 as core words of molecular bundles (molecular core words).

Six bundle structures corresponding to six core words are stored in the bundle data DB 211. The below table 2 shows data structure of the six bundles.

TABLE 2

| Bundle | Data structure |
| --- | --- |
| atomic bundle (b1) | b1(NULL), b2(b1), b3(b2), b4(b3), b5(b2'), b6(b5), b7(b5'), b8(b3'), b9(b8), b10(b9), b11(b8'), b12(b9') |
| molecular bundle 1 (b2) | b2(NULL), b5(b2'), b6(b5), b7(b5') |
| molecular bundle 2 (b3) | b1(NULL), b8(b3'), b9(b8), b10(b9), b11(b8'), b12(b9') |
| molecular bundle 3 (b5) | b5(NULL), b6(b5) |
| molecular bundle 4 (b8) | b8(NULL), b9(b8), b10(b9), b12(b9') |
| molecular bundle 5 (b9) | b9(NULL), b12(b9') |

In the above table 2, a word indicated in the parenthesis ( ) means a link information referring to the previous word and subscript ' means connection to the previous word by a vertical line. This data structure allows the bundle data DB 211 to store word data and connection relation of word data and the search server 2 to represent graphic bundle data by connection relation of the retrieved bundle data.

Figure 13:
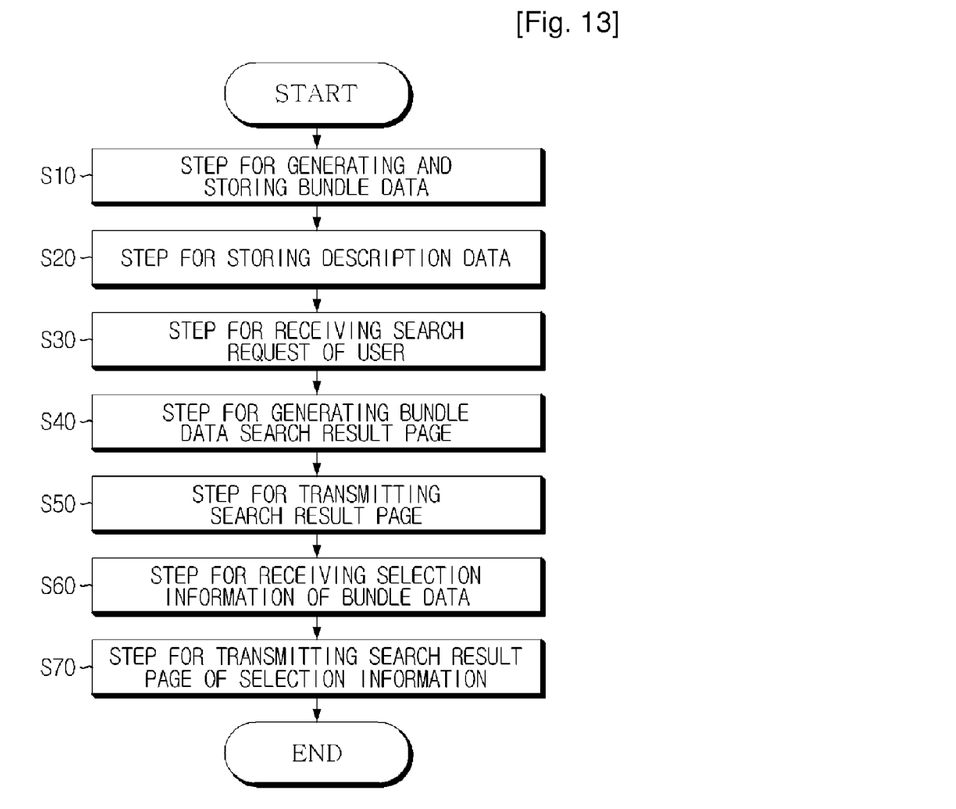
FIG. 13 is a general flow of a bundle database management method in accordance with an exemplary embodiment of the present invention.

FIG. 13 is a general flow of a bundle database management method in accordance with an exemplary embodiment of the present invention.

In the step for generating and storing bundle data (S10), the search server 2 defines a core word and a relevant word between words by a search word as a word and defines connection relation between the core word and the relevant word to store it in the bundle data DB 211 (S10). The search server 2 also stores description data corresponding to individual words forming bundle data in the description data DB 211.

For incorporating this, the search server 2 provides a bundle data DB generator with a program means that allows the bundle data DB generator to designate a core word and a relevant word and input description data for each word through an input device. The bundle data DB generator may be an executive corporation of the search server 2 or an ordinary user having his/her blog or mini homepage in the search server 2.

The user inputs a search word in the user terminal 3 and transmits a search request to the search server 2. The search server 2 receives the search request (S30).

The search server 2 retrieves the bundle data DB 211 and the description data DB 221 by a search word to generate the search result page. Describing more specifically with reference to FIG. 14, the received search word is set as a core word (S41) and the bundle data DB 211 is retrieved by the set core word to generate graphic bundle data by the retrieved data (S42). At this time, another bundle having a relevant word connected to the core word as another core word is retrieved and the bundles are connected in the above-mentioned manner.

Figure 14:
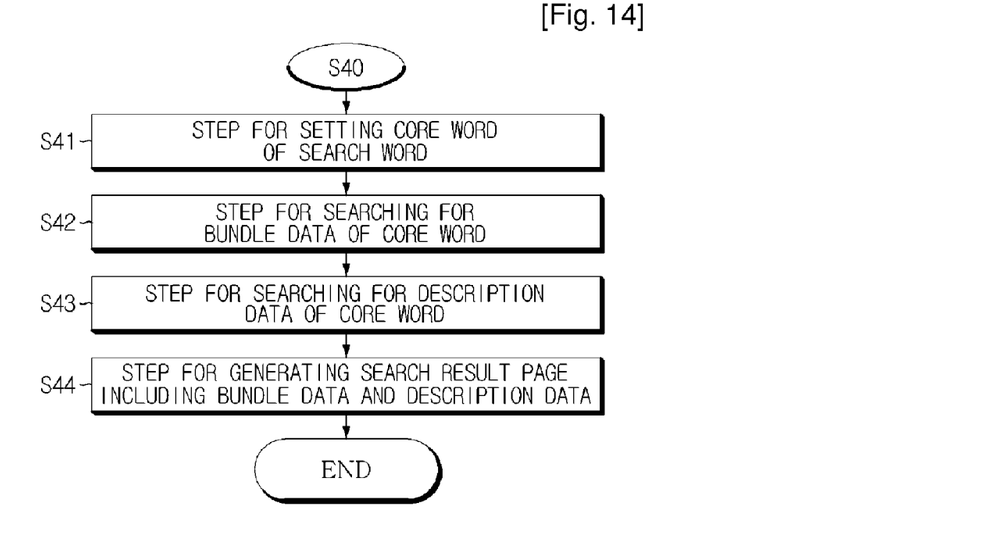
FIG. 14 is a detailed flow of a step for generating a search result page in accordance with an exemplary embodiment of the present invention.

The description data DB 221 is retrieved by all of the core word and relevant word included in the connected bundles to fetch description data (S43). And a search result page including graphic bundle data and description data is generated (S44). Here, a word cell of the graphic bundle data forming the search result page has a hyperlink (URL information) referring to description data.

The search server 2 transmits the generated search result page to the user terminal 3 in response to the search request (S50).

The user retrieves related words and identify description data through the graphic bundle data represented on the received search result page. At this time, when the user selects a specific relevant word on bundle data for more detailed information, the search server receives selection information (URL information) of the word (cell) (S60).

The search server 2 retrieves the corresponding description data from the description data DB 221 based on URL information included in the selection information to generate the search result page and transmit it to the user terminal 3.

Figure 15:
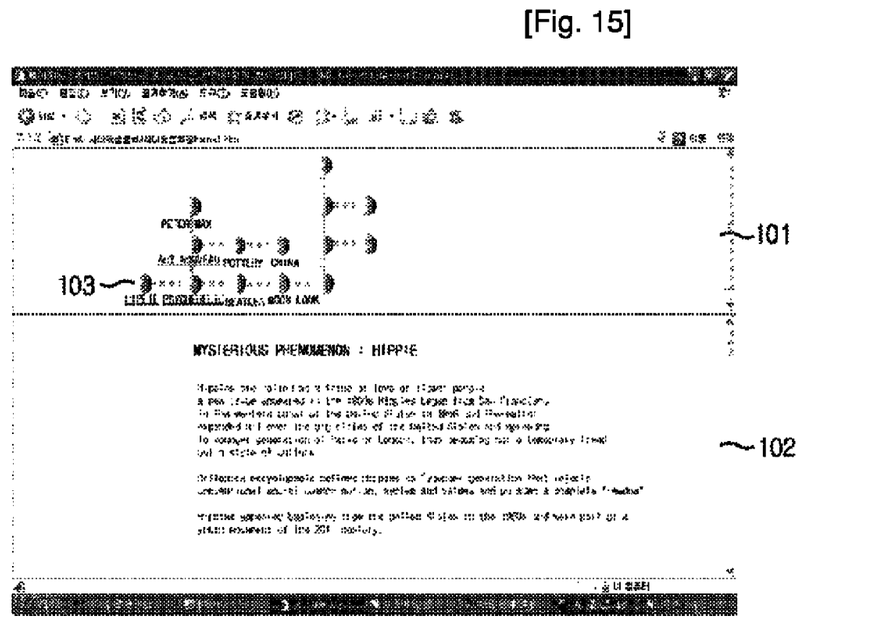
FIG. 15 is an example view of a screen of the search result page in accordance with an exemplary embodiment of the present invention.

FIG. 15 shows a screen of the search result page according to an exemplary embodiment of the present invention.

FIG. 15 illustrates a search result page generated by a search word "hippie" input by the user. The search result page includes a bundle data frame 101 and a description data frame 102.

In the bundle data frame 101, bundle data having a search word of the user as a core word 103 is graphically represented. Words (cells) forming graphic bundle data have a hyperlink. If the user wants to identify information of the description data frame 102 and obtain the more detailed information or related information, the user selects a specific word of the graphic bundle data. The selection information of the specific word as URL information is transmitted to the search server 2. The search server 2 displays bundle data 104 (FIG. 6) and description data of the specific word on the description data frame 102. Therefore, the user is provided with bundle data representing relevant word information as well as the desired search result through a single time of input of a search word, and thus the user can search a wide-ranging knowledge and grasp where the current search result is located in the whole search result.

Figure 16:
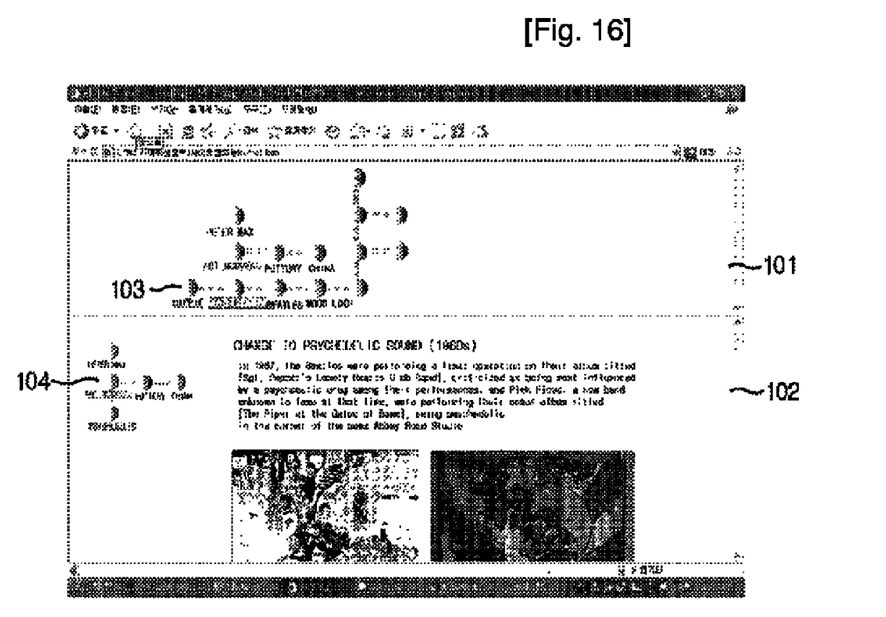
FIG. 16 is an example view of a screen of a molecular bundle search result page in accordance with an exemplary embodiment of the present invention.

FIG. 16 shows a molecular bundle search result page provided in the case that the user selects a relevant word "psychedelic" in FIG. 15.

Figure 17:
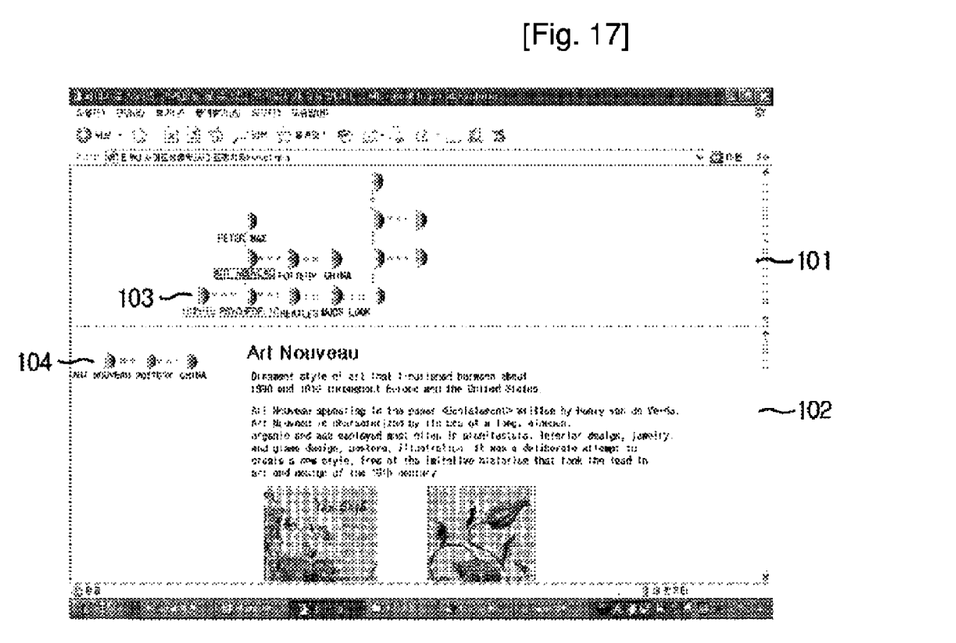
FIG. 17 is an example view of a screen of a molecular bundle search result page in accordance with an exemplary embodiment of the present invention.

FIG. 17 shows a molecular bundle search result page provided in the case that the user selects a relevant word, "Art Nouveau" in FIG. 15.

As described above, the bundle database management system and method for storing data association structure according to the present invention have been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

Bundle database management system and method for storing data association structure according to the present invention represents an association structure of a relevant word (a search word) as well as a direct search result of a search word through a bundle database for storing an association structure between search words with a graphic hierarchy, thereby providing a systematic and high-quality comprehensive knowledge search service.

Further, as the user is provided with search result, the user clicks a relevant word on the provided bundle data without the need to input a search word again, thereby simplifying search interface, providing search result of related knowledge as well as desired search result, and reducing search time.

The invention claimed is:

1. A bundle database management system for generating storing and searching bundle data defining an association structure between individual words having relation to each other, the system comprising:
    a search server having a processor connected to a memory, the search server comprising:
    a bundle definition unit configured to define a core word, a relevant word connected to the core word, and another relevant word derived from the relevant word regarded as another core word, generate bundle data defining an nth connection relation between the core word and the relevant word as a graph hierarchy structure, and store the generated bundle data;
    a description definition unit configured to store description data corresponding to the core word and relevant word;
    a search request receiving unit configured to receive a search request including a specific search word input by a user;
    a search result page generating unit configured to generate the search result page including the bundle data having a search word in its core word and the description data relating to the core word; and
    a search result page transmitting unit configured to transmit the search result page to the user; and
    a user terminal connected to the search server, the user terminal being configured to transmit the search request and receive the search result page,
    wherein the search server generates, stores and searches bundle data constituting n-dimensional (n>1) bundle, the n-dimensional bundle having a repetitive connection structure, comprising:
    a first (n=1) bundle in which at least one relevant word corresponding to a single core word is connected;
    a second (n=2) bundle in which an arbitrary relevant word constituting the first bundle becomes a single core word and at least one relevant word connected to the single core word is connected; and
    a third (n=3) bundle in which an arbitrary relevant word constituting the second bundle becomes a single core word and at least one relevant word connected to the single core word is connected,
    and wherein the search server connects bundle data through any one method selected from a group or a connection method thereof, the group consisting of:
    a horizontal line A-type connection for converting a relevant word located on a horizontal line (odd-bundle) into a core word and connecting a horizontal bundle to the core word by a vertical line derived from the core word;
    a horizontal line B-type connection rotating a horizontal bundle and connecting the horizontal bundle by the horizontal line when adding a new relevant word (core word) to the rightmost side of a horizontal line;
    a horizontal line B-type insertion connection for converting a bundle into a rotated bundle and inserting the bundle between relevant words located on a horizontal line;
    a vertical line B-type connection for converting a relevant word located on a vertical line (even bundle) into a core word and connecting a rotated bundle to the core word by a horizontal line derived from the core word;
    a vertical line end A-type connection for connecting a horizontal bundle by the vertical line when adding a new relevant word (core word) to the uppermost side of a vertical line; and a vertical line A-type insertion connection for inserting a bundle between relevant words located on a vertical line.

2. The bundle database management system of claim 1, wherein the search server represents the bundle data to the user with a graph hierarchy structure that horizontally connects at least one relevant word for each core word in odd bundles (n=1, 3, 5, . . . ), and vertically connects at least one relevant word for each core word in even bundles (n=2, 4, 6, . . . ).

3. The bundle database management system of claim 1, wherein the search server includes:
   a bundle database (DB) for storing the core word, the relevant word and their connection relation constituting bundle data; and
   a description data DB for storing description data corresponding to an individual word stored in the bundle data.

4. The bundle database management system of claim 1, wherein the search server receives selection information of a specific word from the user terminal, the specific word constituting bundle data represented with a graphic structure in the search result page, and includes the description data retrieved by the specific word in the search result page to provide it to the user terminal.

5. The bundle database management system of claim 1, wherein in the step of generating a search result page, the search server includes uniform resource locator (URL) information referring to description data corresponding to each of the core word and the relevant word constituting the bundle data in the search result page to transmit it to the user terminal.

6. A bundle database management method for generating, storing, and searching bundle data defining an association structure between individual words having relation to each other, the method comprising the steps of:
   (1) defining, with a processor, a core word, a relevant word connected to the core word, and another relevant word derived from the relevant word regarded as another core word, generating bundle data defining an nth connection relation between the core word and the relevant word as a graph hierarchy structure, and storing the generated bundle data;
   (2) storing description data in a memory, the description data corresponding to the core word and the relevant word;
   (3) receiving a search request including a specific search word input by a user;
   (4) generating, with a processor, a search result page including the bundle data having a search word as its core word and the description data relating to the core word; and
   (5) transmitting the search result page to a user terminal, wherein the step of (1) generating and storing bundle data comprises generating the bundle data having n-dimension (n>1) bundle and storing the bundle data in a bundle data DB, the n-dimensional bundle having a connection structure comprising:
   a first (n=1) bundle in which at least one relevant word corresponding to a single core word is connected;
   a second (n=2) bundle in which an arbitrary relevant word constituting the first bundle becomes a single core word and at least one relevant word connected to the core word is connected; and
   a third (n=3) bundle in which an arbitrary relevant word constituting the second bundle becomes a single core word and at least one relevant word connected to the core word is connected, and
   wherein the step of (4) generating a search result page comprises connecting bundle data through any one method selected from a group or a connection method thereof, the group consisting of:
   a connection (a horizontal line A-type connection) for converting a relevant word located on a horizontal line (odd bundle) into a core word and connecting a horizontal bundle to the core word by a vertical line derived from the core word;
   a connection (a horizontal line end B-type connection) for rotating a horizontal bundle and connecting the horizontal bundle by a horizontal line when adding a new relevant word (core word) to the rightmost side of the horizontal line;
   a connection (a horizontal line B-type insertion connection) for converting a bundle into a rotated bundle and inserting the bundle between relevant words located on a horizontal line;
   a connection (a vertical line B-type connection) for converting a relevant word located on a vertical line (even bundle) into a core word and connecting a rotated bundle to the core word by a horizontal line derived from the core word;
   a connection (a vertical line end A-type connection) for connecting a horizontal bundle by a vertical line when adding a new relevant word (core word) to the uppermost side of a vertical line; and
   a connection (a vertical line A-type insertion connection) for inserting a bundle between relevant words located on a vertical line.

7. The bundle database management method of claim 6, wherein the step of (2) storing description data includes storing description data corresponding to the core word and relevant word in a description data DB.

8. The bundle database management method of claim 6, wherein the step of (4) generating a search result page includes the steps of:
   (4-1) setting the received search word as a core word;
   (4-2) retrieving the bundle data DB by the core word to search for the bundle data;
   (4-3) retrieving the description data DB by the core word to search for the corresponding description data; and
   (4-4) generating the search result page including the bundle data and the description data.

9. The bundle database management method of claim 6 or 8, wherein the step of (4) generating a search result page includes the step of including the bundle data in the search result page, the bundle data being in odd bundles (n=1, 3, 5) represented in such a graphic structure that at least one relevant word for each core word are horizontally connects and in even bundles (n=2, 4, 6) represented in such a graphic structure that at least one relevant word for each core word are vertically connected.

10. The bundle database management method of claim 6 or 8, wherein the step of (4) generating a search result page includes generating the search result page including URL information referring to description data corresponding to each of the core word and the relevant words constituting the bundle data.

11. The bundle database management method of claim 6, further comprising the steps of:
   (6) receiving selection information of a specific word constituting bundle data from the user terminal, the bundle data represented in a graphic structure at the search result page; and
   (7) including the description data retrieved by the specific word in the search result page to provide it to the user terminal.

* * * * *